United States Patent [19]

Chesler

[11] 3,753,145

[45] Aug. 14, 1973

[54] COMPACT END-PUMPED SOLID-STATE LASER

[75] Inventor: Ronald Benjamin Chesler, Summit, N.J.

[73] Assignee: Bell Telephone Laboratories Incorporated, Murray Hill, N.J.

[22] Filed: June 26, 1972

[21] Appl. No.: 265,978

[52] U.S. Cl................................. 331/94.5, 330/4.3
[51] Int. Cl............................................... H01s 3/09
[58] Field of Search...................... 331/94.5; 330/4.3

[56] References Cited
UNITED STATES PATENTS

| | | |
|---|---|---|
| 3,196,366 | 7/1965 | Simpson............................. 331/94.5 |
| 3,566,300 | 2/1971 | Simpson et al. ................... 331/94.5 |
| 3,354,404 | 11/1967 | Boyle et al......................... 331/94.5 |
| 3,624,545 | 11/1971 | Ross................................... 331/94.5 |
| 3,538,455 | 11/1970 | Florio ................................ 331/94.5 |
| 3,316,500 | 4/1967 | Newman............................ 331/94.5 |

*Primary Examiner*—William L. Sikes
*Attorney*—W. L. Keefauner et al.

[57] ABSTRACT

A cylindrically shaped rod of neodymium doped yttrium aluminum garnet (Nd:YAG) is pumped into laser operation by means of an incoherent light emitting semi-conductor diode, or array of such diodes, whose output is compactly coupled to the rod through an end surface of the rod.

10 Claims, 1 Drawing Figure

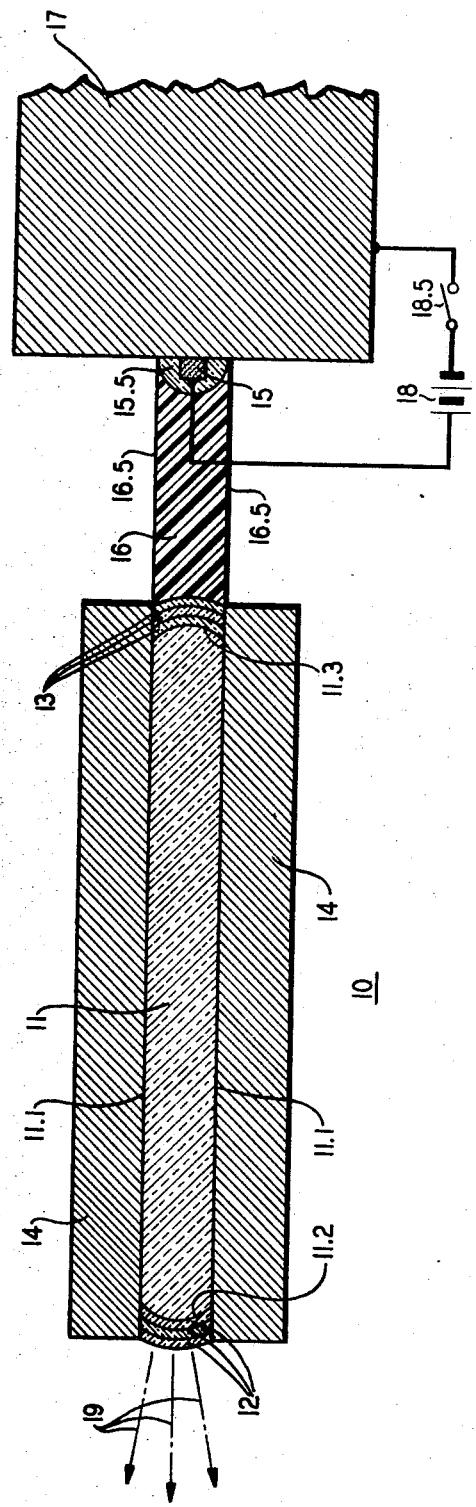

COMPACT END-PUMPED SOLID-STATE LASER

FIELD OF THE INVENTION

This invention relates generally to the field of laser apparatus, and more particularly to solid-state lasers which employ semiconductor pumping means.

BACKGROUND OF THE INVENTION

In U.S. Pat. No. 3,624,545 (issued to M. Ross on Nov. 30, 1971), there is disclosed a neodymium doped yttrium aluminum garnet ("Nd:YAG") laser rod, which is optically side-pumped by means of an array of auxiliary semiconductor laser pumps. By side-pumped is meant that the pumping radiation is supplied by the pumps through a "side" surface ("sidewall") of the laser rod; whereas the output laser radiation from the laser rod is emitted through an "end" wall of the rod. However, for optimum output efficiency, such a side-pumped Nd:YAG laser configuration requires the diameter of the Nd:YAG laser rod to be about 5 millimeters (the absorption length of the strongest optical pumping band, centered at 8,050 angstroms). The length of such a Nd:YAG laser rod therefore is usually at least about 50 millimeters, in order to preserve a reasonable gain-to-loss ratio (and hence overall laser emission efficiency).

Accordingly, it would be desirable to have a more compact structure for an optically pumped Nd:YAG laser. In addition, a Nd:YAG laser arrangement which is pumped by means of auxiliary semiconductor lasers has a rather severely limited lifetime, by reason of the limited life of the semiconductor laser pumps, typically 100 hours or less. It would be further desirable, therefore, to have a more compact Nd:YAG laser which can be stimulated by optical pump sources whose lifetimes, particularly in continuous wave ("CW") operation, are not so limited as the lifetimes of semiconductor laser pumps.

SUMMARY OF THE INVENTION

In accordance with this invention, relatively long life incoherent optical sources, such as light emitting semiconductor diodes, are used to pump a Nd:YAG laser rod. The laser rod is provided with suitable reflecting layers on both of its end surfaces to form an optical laser cavity, and this laser rod is incoherently end-pumped by means of one or more light emitting diodes ("LED's"). By "end-pumped" is meant that the pumping radiation is applied to the rod through an end surface thereof, i.e., opposite the end surface through which the coherent output of the laser rod is emitted. Thereby, the overall length of the entire laser assembly, including its heat sinks, can be made less than 10 millimeters in this end-pumped configuration. In this end-pumped configuration, moreover, the largest area of the cross section of the pump LED (or array of such LED's) is selected to be of the same size as, or smaller than, the largest area of the cross section of the laser rod. Thereby, overall compactness of size of the entire assembly is achieved, and at the same time a high efficiency of optical coupling of pump radiation from source to laser rod is maintained.

Moreover, in order to maintain physical compactness and optical coupling efficiency, the pump LED is advantageously compactly coupled to the laser rod; that is, the largest area of cross section of the coupling means ("coupling region") between the pump LED and the laser rod is of the same (or smaller) size as the largest area of the cross section of the laser rod. In its broader aspects, this cross section of the coupling region is everywhere defined by the cross section of that portion of the optical wave beam which is propagating from the pump to the laser rod, without any collimating mirrors or lenses being required. In particular, such coupling region can simply include a hollow cylinder with specularly reflecting walls having the same diameter as that of the rod. However, using sufficiently strong pump sources, and at the expense of some efficiency of optical coupling, the walls of such a cylinder can be omitted, so that merely the space between the pump and the laser rod can serve as the coupling means or region. In any event, in general, the refractive index in a substantial portion (preferably greater than one-half) of the coupling region between the pump and the laser rod should have an index of refraction for the pump radiation which is no greater than that of the laser rod.

The size of the cross section of the coupling region, at the location of the pump input side thereof where the index of refraction becomes no greater than that of the laser rod, is of further importance in this invention. Too large a cross section of the coupling region at the aforementioned location will cause undesirable loss in optical coupling efficiency between the pump source and the laser rod; whereas too small a cross section thereat will result in a diminished optical pump power density in the rod. Therefore, advantageously, the area of cross section of the coupling region thereat is made substantially equal to the area of cross section of the input end of the laser rod.

The laser rod, together with the pump LED and coupling means, can be mounted in an assembly situated on a commercial dry cell battery which supplies electrical power to the LED. Thereby, there is provided a completely self-contained solid-state laser assembly which can be carried by a human hand.

BRIEF DESCRIPTION OF THE DRAWING

This invention together with its features, in which the Figure shows in cross section a compact solid-state laser assembly, is in accordance with a specific embodiment of the invention. For the sake of clarity only, the drawing is not to scale.

DETAILED DESCRIPTION

As shown in the Figure, a laser assembly 10 includes a circularly cylindrical laser rod 11 whose sidewall 11.5 is coated with a specular reflecting layer 11.1. The end surfaces 11.2 and 11.3 of the laser rod 11 are covered with suitable dielectric mirror coatings 12 and 13, in order to provide a resonant cavity therebetween in the laser rod for the stimulation of coherent laser output radiation 19. Advantageously, the end surfaces of the rod 11.2 and 11.3 are curved, in order to create the desired transverse mode structure in the laser radiation. A heat sink 14 advantageously surrounds the specular reflecting coating 11.1 on the sidewalls of the rod 11. A light emitting semiconductor diode ("LED") 15 serves as an optical pump source of incoherent optical radiation for the stimulation of laser emission in the laser rod 11. Advantageously, for better optical coupling of the radiation propagating from the diode 15 to the rod 11, the diode 15 is surrounded (except for its right-hand major surface) by a transparent dome 15.5 of suitable refractive index. Optical pump radiation emitted by the diode 15 is coupled into the laser rod 11 serially through the dome 15.5 and through a transparent coupling member 16 situated between this dome 15.5 and the dielectric mirror 13. Advantageously, the sidewall of coupling member 16 is coated with a specularly reflecting layer 16.5. A metallic heat sink 17, attached to the right-hand major surface of the light emitting diode 15, conducts away the heat generated during operation by this diode 15.

A battery 18, or other D.C. power supply, supplies electrical power for energizing the diode 15, as controlled by a switch 18.5. When so energized, the optical radiation from the diode 15 propagates serially through the dome 15.5, the coupling member 16, and the dielectric mirror 13 into the rod where the pump radiation is absorbed. Thereby, coherent output laser radiation 19 is emitted through the dielectric mirror 12 by reason of the coherent radiation processes stimulated in the rod 11 by the incoherent input radiation supplied by the LED 15 through the dielectric mirror 13. For this reason, the dielectric mirror 13 is referred to as the "input" mirror, and the dielectric mirror 12 as the "output" mirror. It should be emphasized that the battery 18 can advantageously take the form of an ordinary commercially available dry cell upon which can be mounted the entire assembly including the laser rod 11 with its heat sink 14, together with the LED (or array) 15 with its heat sink 17, its dome 15.5 and the coupling member 16. Thus, the entire laser assembly, including its heat sinks and power source, can be self-contained and carried in the human hand.

The length of the laser rod 11 is selected to be such that preferably at least about half of the pump radiation from the diode 15 is absorbed in two passes (i.e., one complete pass to and fro) along the length of the rod 11. Thus, this rod 11 should have a length of the order of the absorption length for pump radiation averaged over the pumping band. The rod 11 advantageously has a circularly cylindrical shape with a diameter advantageously less than (or equal to) the length of the rod, depending on the diode (array) diameter and on the laser power output desired.

The output dielectric mirror coating 12 is typically a multilayer dielectric coating, available in the art, which is advantageously selected so that it selectively reflects substantially all of the pump radiation from the diode 15, whereas this coating 12 transmits a few tenths of a percent or more of the coherent radiation which is stimulated in the laser rod 11. On the other hand, the input dielectric mirror coating 13, also available in the art, is selected such that it transmits at least about 80 percent or more of the incoherent pump radiation from the diode 15 and reflects substantially all of the coherent radiation generated at the laser wavelength of the rod 11.

The dome 15.5 is typically hemispherical in shape and advantageously has about the same diameter as that of the laser rod 11. This dome 15.5 is made of a uniform material having refractive index which is advantageously approximately the same as, or slightly less than, the refractive index of the emissive surface of the semiconductor material of the diode 15. In any event, the refractive index of the dome 15.5 should be greater than that of the rod 11 at the pump wavelength, in order to maintain optical coupling efficiency between the diode and the laser rod, which would otherwise be impaired by internal reflection losses. It should be understood, however, that the dome need not necessarily be hemispherically shaped, but that some other centrally projecting symmetric domelike shape, such as hemi-ellipsoidal, can also be used. In any event, the LED 15 is advantageously centrally located with respect to the dome in the plane perpendicular to the cylinder axis of the laser rod 11.

The coupling member 16 advantageously has the same diameter as the common diameter of the laser rod 11 and the dome 15.5. This coupling member 16 typically is made of a uniform material advantageously having about the same or lower refractive index than that of the laser rod 11, again in order to maintain optical coupling efficiency. The length of this coupling member 16 can be selected arbitrarily; however, for overall compactness, this length need be no more than required to bond the dome 15.5 to the dielectric mirror 13 with a coupling medium. The coupling member also provides thermal insulation between the diode 15 and the rod 11.

The pump LED 15 is selected such that it produces an output of radiation which is rich in optical radiation in a spectral range suitable for pumping the material in the rod 11 into laser action. In addition, to avoid the wasteful production of non-utilizable pump radiation, the largest linear dimension of the diode 15 (in any direction perpendicular to the cylinder axis of the laser rod 11) is selected to be equal to, or smaller than, the diameter of the dome 15.5. More particularly, it is advantageous that the largest diameter of the light emitting portion of pump LED 15 (or of an array of such LED's), in any direction perpendicular to the axis of the laser rod 11, be made equal to the diameter of the rod 11 multiplied by the ratio of the refractive index of the material in the coupling region contiguous to the dome to the refractive index of the dome 15.5 (at the pump band of wavelengths). The diode 15 (or array thereof) should advantageously be no smaller than this, in order to achieve highest optical pump power density in the laser rod; and should advantageously be no larger, in order to enable the most efficient optical coupling from pump source to laser rod. It should be understood, however, that in case of an array of diodes, each diode may have its own separate dome whose aggregate transverse lateral dimensions are coextensive with the input (right-hand) cross section of the laser rod 11.

Each dome can enclose a single diode, or any fraction of the diodes in an array. Furthermore, the ratio of the transverse diameter of each dome enclosing one, many, or all of the diodes, to the maximum transverse diameter of the diode (or array of diodes) enclosed by each dome is advantageously made equal to the ratio of the index of refraction of the dome to the index of the coupling region contiguous to the dome, in the pump wavelength band. Thereby, optical transmission losses are minimized.

The pump radiation emitted by the diode 15 transmitted by the dome 15.5 and coupling means 16, and entering the laser rod 11, is spatially incoherent and uncollimated, that is, has a relatively wide range of angular directions in space, up to a full half sphere of solid angle $2\pi$ steradians. This is to be distinguished from laser pump sources which are all at least partly coherent and spatially collimated. Thus, laser pump radiation would be diffraction limited in angular distribution, or nearly so, within a factor of typically not more than ten times the minimum possible planar diffraction angle, the number of transverse laser modes being equal to the square of this factor; whereas the incoherent optical pump sources contemplated in this invention are characterized by output distributions spread over a planar angle which is more than 10 (and usually 50 or more) times the minimum possible diffraction angle.

It should be understood that although the coupling member 16 in the Figure appears as a cylinder with straight walls, this coupling member can have any curvilinear shape along its length in accordance with ordinary fiber optical design. Advantageously, in any event, the sidewall of the coupling member 16 is coated with a layer 16.5 of material which specularly reflects the pump radiation propagating from the diode 15 to the laser rod 11, in order to confine and couple this radiation more efficiently to the rod 11. As mentioned previously, the coupling member 16 can take the form of merely the specularly reflecting layer 16.5, or more broadly, even the space itself between the diode 15 and the rod 11.

EXAMPLE

In a typical example, by way of illustration only, the laser rod 11 is made of yttrium aluminum garnet which has been doped with neodymium to the extent of about one atomic percent. The rod 11 has a length equal to the absorption length of the pump radiation therein, about five millimeters, and a diameter of about 0.4 millimeters. Both larger and smaller sizes are feasible for either or both dimensions of this rod 11, however. In any case, the length of the Nd:YAG laser rod 11 is selected advantageously within a factor of two or three of the average absorption length of optical radiation in the pumping band. Moreover, preferably the diameter of the laser rod is in the range of between about 0.1 millimeter up to as much as the length of this rod itself.

The coherent laser output 19 has a wavelength of 1.06 micron whereas the incoherent pump radiation from the diode 15 is advantageously rich in optical radiation with a band spectrum whose wavelength is centered at about 8,050 angstroms, i.e., the strongest absorption band of Nd:YAG which can produce laser oscillation. The LED 15 can thus, for example, be a gallium aluminum arsenide diode (for example $Ga_{0.88}Al_{0.12}As$) emitting the required incoherent pump radiation at 8,050 angstroms at room temperature. As an alternative, a gallium arsenide phosphide diode can be used whch emits the desired pump radiation of 8,050 angstroms. Also, it should be understood that other diodes and other wavelengths corresponding to different absorption bands can be used.

The hemispherical dome 15.5 has a refractive index of about 3.5 at 8,050 angstroms, which is approximately the same as the refractive index of the outer semiconductor material in the LED 15 contiguous the dome 15.5. Typically, this dome 15.5 is made of semiconductor material; although a cholcogenide type glass of somewhat lower refractive index, between about 2.2 and 2.8, can also be used. In any case, for better optical coupling, the dome 15.5 can be coated by a nonreflecting layer on its hemispherical surface.

The coupling member 16 is typically an epoxy having an index of refraction of about 1.5, although the natural air (or vacuum) gap between the dome 15.5 and the dielectric coating 13 may also be utilized as coupling of the optical radiation from the incoherent optical pump diode 15 and to the laser rod 11. Thus, in the broader aspects of this invention, the optical coupling means between the pump diode 15 and the laser rod 11 should be understood to include any medium therebetween whose physical cross-sectional extent is everywhere defined by the cross section of that portion of the optical radiation propagating from this optical pump to the laser rod.

The output dielectric mirror 12 advantageously is characterized by a transmissivity in the range between about 0.1 percent and 1 percent for optical laser radiation of 1.06 micron wavelength, and by between about 0 percent and 10 percent transmissivity for pump radiation of 8,050 angstroms. On the other hand, the input dielectric mirror 13 is characterized by a transmissivity between about 0 percent and 0.1 percent at 1.06 micron, and a transmissivity between about 80 percent and 100 percent at 8,050 angstroms. Moreover, the dielectric mirrors 12 and 13 both have a radius of curvature in common with the end surfaces 11.2 and 11.3, for example, 1.7 cm. radius.

In practice, for a Nd:YAG rod 11, it has been found that the threshold current density in the diode 15 for laser action in the rod 11 is about 500 amperes/cm$^2$ in a gallium aluminum arsenide diode 15 having about 15 percent external power efficiency, in conjunction with an output dielectric mirror 12 having about 0.1 percent transmissivity at 1.06 micron and about 10 percent transmissivity at 8,050 angstroms, and an input dielectric mirror 13 having 0 percent transmissivity at 1.06 micron and 90 percent transmissivity at 8,050 angstroms. Thus, relatively long lifetime of this LED pump source 15 can be expected, that is, of the order of years even in CW operation.

The sidewalls of the laser rod 11 are advantageously coated with a gold specularly reflecting layer 11.1 (which need be specularly reflecting only in the pump wavelength band). Likewise, the coupling member 16 has its sidewalls coated with a similar gold layer 16.5, which is similarly specularly reflecting.

The heat sinks 14 and 17 are simply blocks of good thermal conductors of heat, typically metallic copper or silver, as known in the art. To provide air cooling, for example, conventional fins (not shown) are provided on both of these heat sinks.

The battery 18 is simply a commercially available 3-volt "A" cell package, upon which the remainder of the laser assembly is mounted or attached. Thereby the entire laser assembly is self-contained and can be carried by a human hand.

Although this invention has been described in terms of a specific embodiment, it should be obvious to the worker in the art that modifications can be made without departing from the scope of the invention. For example, if higher order modes in the laser cause undesirable output laser beam spreading, such higher modes can be minimized or eliminated by locating the output dielectric mirror 12 at a suitable distance removed from this end of this rod, at some expense of overall compactness however. Such suppression of modes can also, in general, be accomplished by suitable selection of the radii of curvature of the mirrors located contiguously with the ends of the rod as indicated in the drawing.

What is claimed is:

1. A laser assembly which includes a rod of material which can be pumped by incoherent optical radiation into stimulated emission of output coherent optical radiation, and an optical source of the incoherent optical radiation for pumping said rod into said stimulated emission, said source located with respect to the rod such that incoherent optical radiation generated by the source enters the rod through one end surface of the rod, whereby the output coherent optical radiation exits from the rod through the other end surface of the rod, the length of the rod being of the same order of magnitude as the average absorption length in said rod of the incoherent radiation, and said source having a cross section which is no greater than the largest cross section of the rod, so that the largest area of the cross section of the incoherent optical radiation propagating from he source to the rod is everywhere no greater than the largest area of the cross section of the rod.

2. A laser assembly according to claim 1 in which the length of the rod is within a factor of the average absorption length of the incoherent optical radiation in the rod.

3. The laser assembly recited in claim 2 in which the optical source comprises at least one incoherent light emitting diode enclosed in a dome having a refractive index for the incoherent radiation which is greater than that of the laser rod at the pumping wavelength and in which the refractive index of the optical coupling region between the rod and the diode is no greater than that of the rod along a substantial portion of the region in which the incoherent radiation propagates from the diode to the rod, said diode having a largest diameter (in any direction perpendicular to the axis of the rod) which is approximately equal to the diameter of the rod multiplied by the ratio of the refractive index of the coupling region contiguous to the dome to the refractive index of the dome.

4. The laser assembly recited in claim 3 in which the cross section of the incoherent optical radiation, at the location thereof on the pumping input side where the refractive index becomes no greater than that of the laser rod, has a cross section approximately equal to the cross section of the input end of the laser rod.

5. A laser assembly which comprises:
a. a solid laser rod having a length which is of the order of the absorption length averaged over the pumping band, said rod being of a material which can generate coherent optical radiation by means of incoherent optical radiation applied thereto;
b. an optical source of the incoherent radiation;
c. coupling means for optically transmitting the incoherent radiation from the optical source to an end cross-section surface of the rod, said optical source and said coupling means each having a cross section (whereat the incoherent optical radiation propagates from the source to the rod) whose largest diameter is no greater than the largest diameter of the rod, said optical source providing an intensity of incoherent radiation transmitted by the coupling means to the rod which is sufficient to stimulate the laser rod to emit the coherent optical radiation.

6. The assembly recited in claim 5 in which the laser rod is essentially neodymium doped yttrium aluminum garnet.

7. The assembly recited in claim 6 in which the laser rod is doped with approximately one atomic percent neodymium and in which the laser rod has a length of approximately 5 millimeters.

8. The assembly recited in claim 6 in which the laser rod is doped with approximately one atomic percent neodymium and in which the incoherent optical source comprises at least one semiconductor light emitting diode which supplies incoherent pumping radiation centered at a wavelength of approximately 8,050 angstroms.

9. The assembly recited in claim 8 in which at least one diode is a gallium aluminum arsenide incoherent light emitting diode.

10. The assembly recited in claim 8 in which at least one diode is a gallium arsenide phosphide incoherent light emitting diode.

* * * * *